United States Patent [19]

Izumi

[11] 4,334,255
[45] Jun. 8, 1982

[54] PROTECTION DEVICE FOR A VEHICLE-MOUNTED AIR CONDITIONER COMPRESSOR

[75] Inventor: Masao Izumi, Fujisawa, Japan

[73] Assignee: Nissan Motor Company, Limited, Tokyo, Japan

[21] Appl. No.: 196,299

[22] Filed: Oct. 14, 1980

[51] Int. Cl.³ .............................................. H02H 7/00
[52] U.S. Cl. ...................................... 361/22; 62/133; 62/323.4; 123/198 R; 123/179 R
[58] Field of Search ............ 361/22; 62/133, 323.1 U, 62/323.2, 323.3, 323.4; 307/10 R

[56] References Cited

U.S. PATENT DOCUMENTS 3,065,381 11/1962 Kyle .................................... 361/22
3,290,576 12/1966 Jensen et al. ..................... 361/22 X
3,724,230 4/1973 Muto et al. .......................... 62/133
3,844,684 10/1974 Kawamura ...................... 62/133 X

*Primary Examiner*—Reinhard J. Eisenzopf
*Attorney, Agent, or Firm*—Lane, Aitken, Kice & Kananen

[57] ABSTRACT

A protection device for a vehicle-mounted air conditioner compressor wherein an electric current for engaging the electro-magnetic clutch of the air conditioner compressor is also fed through a PTC ceramic resistor disposed between a starter contact of the ignition switch and a terminal of the electro-magnetic clutch during the starting operation of an engine in addition to an operation of the conventional circuit including a compressor relay and a compressor switch.

3 Claims, 2 Drawing Figures

PROTECTION DEVICE FOR A VEHICLE-MOUNTED AIR CONDITIONER COMPRESSOR

BACKGROUND OF THE INVENTION

1. Field of the Invention

The present invention relates to a protection device for a vehicle-mounted air conditioner compressor, and more specifically to a protection device by which compressor trouble such as lubrication failure or deposition of the refrigerant liquid within the compressor cylinder is avoided by periodic driving of the compressor.

The lubrication system of an air conditioner compressor is constructed so that the lubricant oil of the compressor flows through a heat cycle of the air conditioner along with the refrigerant during the operation of the compressor. Therefore, it is necessary to actuate the air conditioner compressor periodically during the period in which the air conditioner system is rarely used.

2. Description of the Prior Art

In the case of an air conditioner compressor, the lubricant oil of the compressor is atomised and circulates during the heat cycle along with the flow of the refrigerant during the normal operation of the compressor. Therefore, if the compressor is stopped for an excessively long time, during the winter season for example, lubrication failure may occur. Such a lubrication failure will render the compressor difficult to start, or it will cause compressor damage such as wear and tear on the compressor cylinder wall or damage of the compressor seals. For example, if the seals in the compressor are damaged, the refrigerant gas begins to leak. Also, the seals become dry because the lubricant oil is not periodically pressurized and forced between the rubber seal and metal compressor shaft.

Furthermore, if the air conditioner system is not operated for a long time, the refrigerant existing within the heat cycle will be deposited in liquid form, little by little within the compressor cylinder. If the compressor is driven under such a condition, it is under an excessive load by compressing the refrigerant liquid, which will result in compressor damage or slippage of the compressor clutch.

In order to avoid such unfavorable conditions, it is therefore necessary to actuate the compressor periodically for supplying the seals in the compressor with the lubricant and for avoiding the deposition of the refrigerant liquid during a period in which the air conditioner system is not operated.

However, in the case of the prior art compressor protection device, the circuit is designed merely to detect the reduction of refrigerant pressure within the heat cycle by the use of a low pressure switch, and to stop the compressor when the refrigerant amount is not sufficient. Since it does not include means for periodically actuating the compressor, the prior art protecting device is not capable of preventing the compressor from lubrication failure or deposition of the refrigerant within the compressor cylinder caused by a long period of nonuse. Therefore, a periodic manual operation of the air conditioner switch is necessary in the case of the prior art protection device. However such operation of the air conditioner switch is quite troublesome, especially during the winter season when the air conditioner system is not used, although it is necessary for the protection of the compressor and for lengthening the life thereof.

The present invention, based on the recognition of the above mentioned problem, is to provide a compressor protection device for preventing lubrication failure and deposition of the refrigerant by periodic actuation of the compressor.

SUMMARY OF THE INVENTION

According to the invention, there is provided a protection device for a vehicle-mounted air conditioner compressor comprising an electro-magnetic clutch of an air conditioner compressor, an ignition switch having a plurality of contacts including an on contact and a starter contact, a compressor relay having a pair of relay contents, each of which is connected respectively to the ignition switch on contact and to a terminal of the electro-magnetic clutch, the relay coil of which is energized by an electric current flowing through the on contact of the ignition switch and a PTC ceramic resistor (a positive temperature coefficient semiconductor thermistor made of the barium titanate ceramic) connected between the starter contact of the ignition switch and the terminal of the electro-magnetic clutch.

An object of the invention is therefore to provide a protection device for an air conditioner compressor in which the electric current for engaging the electro-magnetic clutch of the air conditioner compressor is also supplied through a PTC ceramic resistor interposed between the starter contact of the ignition switch and a terminal of the electro-magnetic clutch during the starting operation of an engine.

BRIEF DESCRIPTION OF THE DRAWINGS

The features and advantages of the protection device of the present invention will be more clearly appreciated from the following description taken in conjunction with the accompanying drawings in which like reference numerals designate corresponding elements, and in which.

DESCRIPTION OF THE PREFERRED EMBODIMENT

Figure 1:
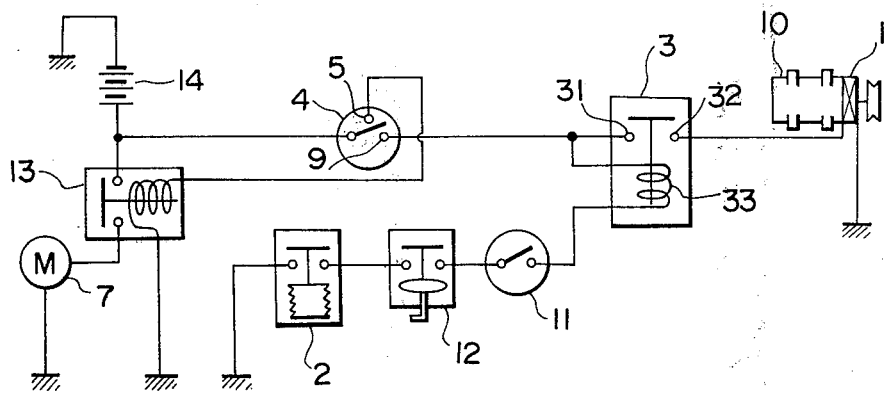
FIG. 1 is a circuit diagram of a prior art protection device for an air conditioner compressor.

Before entering into the description of the embodiment, reference is first made to FIG. 1, indicating an example of a prior art protection device.

As shown, a prior art protection device for a vehicle-mounted air conditioner compressor comprises a compressor relay 3 having a pair of relay contacts 31 and 32, the relay contact 31 being connected to an on contact 9 of an ignition switch 4, and the other relay contact 32 being connected to an electro-magnetic clutch 1 of the compressor 10. A compressor switch 11, a thermostatic switch 12 and a low pressure switch 2 are connected in series between the ground side terminal of a relay coil 33 of the compressor relay 3 and ground.

The starter circuit of an engine is also shown in FIG. 1, in which the reference numeral 5 indicates a starter contact of the ignition switch 4, the reference numeral 7 indicates a starter motor, numeral 13 indicates a starter relay and numeral 14 indicates a source of electric power.

As aforementioned, since this prior art protection device is designed merely to detect the reduction of the pressure of the refrigerant in the heat cycle by the use of the low pressure switch 2 interposed in the control circuit of the air conditioner compressor, it is not capable of protecting the compressor from the troubles caused by longtime nonuse such as lubrication failure or deposition of refrigerant liquid within the compressor cylinder.

Figure 2:
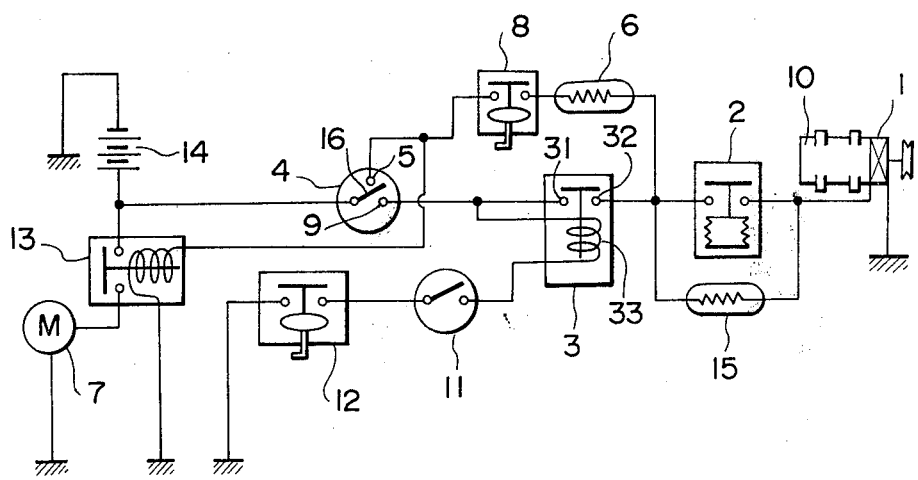
FIG. 2 is a circuit diagram of a protection device for an air conditioner compressor according to the present invention.

Referring to FIG. 2, an embodiment of the present invention will now be described. The protection device of this embodiment comprises a compressor relay 3 having a pair of relay contacts 31 and 32, the contact 31 being connected to an on contact 9 of an ignition switch 4, and the other contact 32 being connected via a low pressure switch 2 to an electro-magnetic clutch 1 of a compressor 10. A terminal of a relay coil 33 of the compressor relay 3 is connected to a series circuit of a compressor switch 11 and a thermostatic switch 12. The compressor switch 11 is provided for operating the air conditioner and is disposed at a preferable position within an instrument board. The thermostatic switch 12 is disposed in an evaporator (not shown) of the air conditioner for controlling the operation of the compressor according to the ambient temperature.

A starter contact 5 of the ignition switch 4 is connected to a terminal of the low pressure switch 2 through a PTC ceramic resistor 6 and an outside temperature switch 8. The low pressure switch 2 is disposed at a position of the heat cycle between a liquid tank (not shown) and an expansion valve (not shown) for detecting the pressure of the refrigerant in order to stop the operation of the compressor 10 when the refrigerant pressure drops below a predetermined level.

In this embodiment, the temperature responsive outside temperature switch 8 is in series with the PTC ceramic resistor 6 to control the circuit in accordance with the outside temperature. The driving current for the electro-magnetic clutch 1 is thereby disabled when the outside temperature is below a predetermined level, such as 0° C. Furthermore, there is provided a PTC ceramic resistor 15 in parallel with the low pressure switch 2, so that the initial drive current of the electro-magnetic clutch 1 also flows through the PTC ceramic resistor 15. The provision of this PTC ceramic resistor 15 enables the threshold pressure level of the low pressure switch 2 to be raised as compared with the low pressure switch of the conventional protection device.

When the air conditioner is started in a low temperature condition, for example below 15° C., the pressure of the refrigerant remains low until the heat cycle is warmed up. Therefore, it is necessary to set the threshold pressure level of the prior art low pressure switch to a level much lower than the operating pressure of the refrigerant within the heat cycle, such as 2 kg/cm².

As for the present protecting device, since the initial driving current for the compressor clutch is supplied through the PTC ceramic resistor 15, it is possible to start the operation of the heat cycle even if the threshold level of the low pressure switch 2 is raised to a much higher level, such as 8-9 kg/cm². Therefore, the reduction in the amount of refrigerant is positively detected by the low pressure switch 2 in order to stop the compressor operation even if the amount of leakage is very small, in the case of the present protection device. Furthermore, respective PTC ceramic resistors 6, 15 are selected to have preferable characteristics for effectually cutting off the driving current of the electro-magnetic clutch 1 when they are heated.

The operation of the protection device of the present invention will be now explained.

According to this protection device, when a movable contact 16 of the ignition switch 4 is connected to the starter contact 5 thereof when starting the engine, the starter relay 13 is energized to feed the driving current to the starter motor 7. At the same time, a driving current is flowing into the electro-magnetic clutch 1 of the compressor 10 through the outside temperature switch 8, the PTC ceramic resistor 6, the low pressure switch 2, and the PTC ceramic resistor 15 connected in parallel therewith, unless the outside temperature switch 8 is opened. Then the electro-magnetic clutch 1 is engaged so that the compressor 10 is driven by the engine crank shaft for the time the starter motor 7 is being driven.

During this cranking operation by the starter motor 7, if the engine does not start and the ignition switch 4 is switched to its starter position for an excessively long time, the PTC ceramic resistor 6 will be heated by the electric current flowing therethrough. When the temperature reaches a predetermined temperature level inherent to this PTC ceramic resistor (such as 150°-200° C.), the electric resistance thereof rapidly rises and the driving current of the electro-magnetic clutch 1 is shut off.

Furthermore, if the outside temperature is below a predetermined level, which causes the outside temperature switch 8 to open, the compressor 10 is not actuated since the driving current of the electro-magnetic clutch 1 is interrupted by this outside temperature switch 8.

It will be appreciated from the foregoing that the electro-magnetic clutch 1 is supplied with a driving current through a PTC ceramic resistor 6 disposed between the starter contact 5 of the ignition switch 4, so that the operation of the ignition switch 4 causes the energization of the electro-magnetic clutch 1. Thus, the compressor 10 is driven to circulate the refrigerant through the heat cycle for a while, thereby supplying lubricant to the seals in the compressor, preventing it from becoming dry. In addition, since the starter motor is operated at every engine starting operation, consequently the compressor 1 is necessarily operated at every starting operation of the engine.

In this manner, lubrication failure and deposition of the refrigerant within the compressor is avoided. Furthermore, an excessively long time operation of the compressor during the engine starting period is prevented since the circuit is constructed so that the driving current of the electro-magnetic clutch flows through the PTC ceramic resistor 6. The electric current through this PTC ceramic resistor 6 causes rapid rise in the resistance thereof after a period of time, and the energization of the electro-magnetic clutch 1 is automatically terminated.

Furthermore, since the embodiment described above includes a temperature responsive outside temperature switch 8 connected in series with the PTC ceramic resistor 6, the driving current of the electro-magnetic clutch 1 is shut off when the outside temperature is below a predetermined level. Thus, the useless consumption of electric power from the storage battery caused by an increase of frictional resistance is avoided.

It should be noted that, although the parallel circuit of the PTC ceramic resistor 15 and the low pressure switch 2 is interposed between the compressor relay 3 and the electro-magnetic clutch 1 in the above embodiment, the low pressure switch 2 and the PTC ceramic resistor 15 can be disposed in the circuit of the relay coil 33 of the compressor relay 3 as in the prior art protection device. Furthermore, the invention is readily applied to an air conditioner compressor protection circuit in which the energization of the electro-magnetic clutch is controlled by an ignition switch, a compressor switch, a thermostatic switch and the low pressure switch connected in series with each other.

What is claimed is:

1. A protection device for a vehicle air conditioner compressor comprising:

an electro-magnetic clutch of an air conditioner compressor;

an ignition switch having a plurality of contacts including an on contact and a starter contact;

a compressor relay having a pair of relay contacts, each of which being connected respectively to the on contact of the ignition switch and a terminal of the electro-magnetic clutch, the relay coil of which is energized by an electric current flowing through the on contact of the ignition switch; and a PTC ceramic resistor connected between the starter contact of the ignition switch and the terminal of the electro-magnetic clutch, said PTC ceramic resistor being provided for allowing a driving current of said electro-magnetic clutch for a predetermined duration after a time when said ignition switch is switched to said starter contact.

2. A protection device as claimed in claim 1, further comprising a temperature responsive switch connected in series with the PTC ceramic resistor which opens upon detection of a predetermined outside temperature.

3. A protection device as claimed in claim 2, further comprising a low pressure switch interposed between the terminal of the electro-magnetic clutch and the relay contact of the compressor relay which opens upon detection of a reduction in the refrigerant pressure.

* * * * *

UNITED STATES PATENT AND TRADEMARK OFFICE
CERTIFICATE OF CORRECTION

PATENT NO. : 4,334,255

DATED : June 8, 1982

INVENTOR(S) : Masao Izumi

It is certified that error appears in the above—identified patent and that said Letters Patent is hereby corrected as shown below: On the title page The address of the assignee, Nissan Motor Company, Limited should be:

Yokohama, Japan

*Signed and Sealed this*

*Fourteenth* Day of *September 1982*

[SEAL]

*Attest:*

*Attesting Officer*

GERALD J. MOSSINGHOFF

*Commissioner of Patents and Trademarks*